May 27, 1958
C. EHRESMANN
2,836,087
DOWEL DRILLING JIG
Filed Sept. 11, 1957
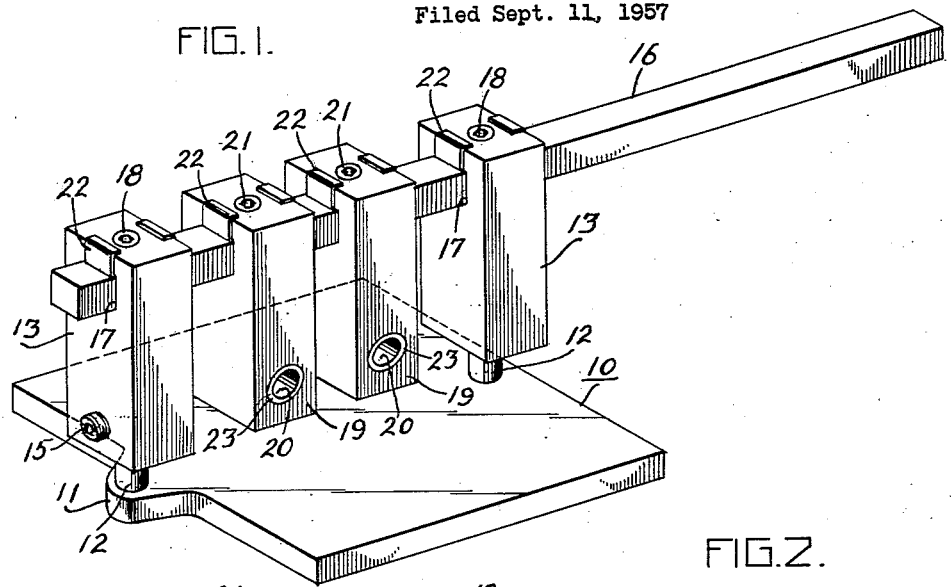
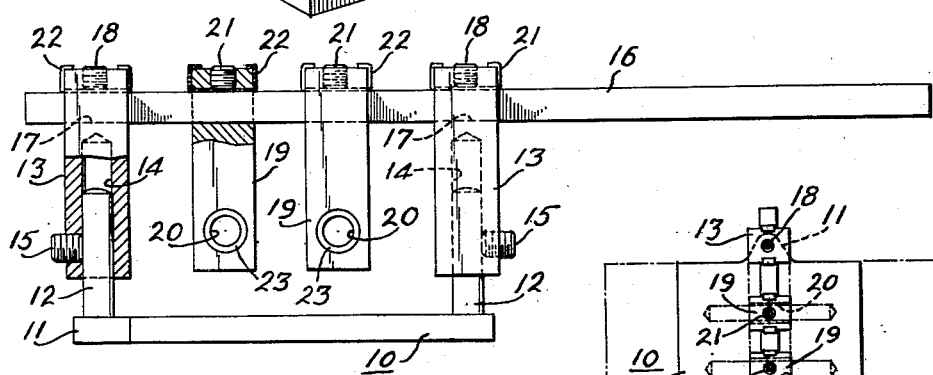
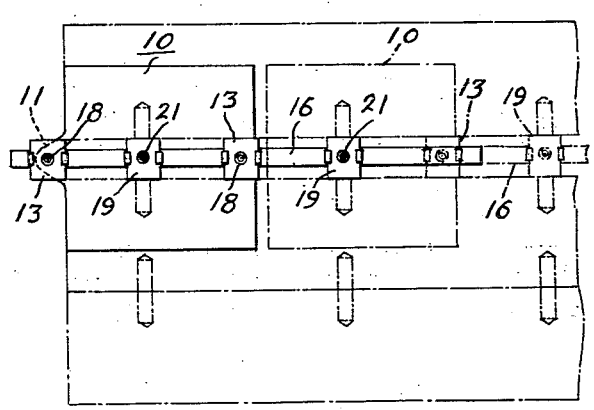
INVENTOR:
CHARLES EHRESMANN
BY Howson & Howson
ATTYS.

United States Patent Office 2,836,087
Patented May 27, 1958

2,836,087

DOWEL DRILLING JIG

Charles Ehresmann, Philadelphia, Pa.

Application September 11, 1957, Serial No. 683,306

6 Claims. (Cl. 77—62)

The present invention relates to new and useful improvements in doweling jigs and more particularly to a new and useful hand-tool device for use in aligning and forming dowel pin joints between structures to be fitted together.

Dowel joints are employed to secure an accurate alignment between different structural articles that are to be mated together. On making a doweled connection, for example, it is necessary to drill holes extending into the members to be joined, with the holes disposed in each piece in an equidistant longitudinal and vertical relation. The dowel pins are inserted into these holes and the members are glued or otherwise secured together. To insure a perfect alignment it is imperative that the holes be spaced apart exactly the same distance and extend perpendicularly into each member. Additionally, in order to secure a flush joint between the members, the holes must be accurately positioned relative to the flush outer and end surfaces of the joint. Prior to the present invention this positioning and aligning of the dowel holes was accomplished by measurement and line to line adjustment as by a scale or ruler and there was no jig available which incorporated these factorial elements entirely in the tool itself for any desired type and size joint. The present invention provides a device for locating dowel holes and guiding a twist drill or the like during drilling of the holes wherein formation of a perfect dowel joint is insured. The inherent capabilities of the device eliminate the need for any laboriously schematic measurements so that location of holes is attained more accurately than by hand measure.

With the foregoing in mind, the principal object of the present invention is to provide a device to be used in conjunction with standard twist drills to locate and form dowel holes in articles to be joined by a dowel joint.

Another object of the present invention is to provide an accurate adjusting means so that the dowel holes may be spaced any desired distance with respect to one another without any outside measuring device.

A further object of the present invention is the provision of adjustable means whereby a guide for the twisting drill can be located any desired height with respect to the base plate of the jig thereby incorporating a verticals as well as a horizontal adjustment in the device.

A still further object of the present invention is to provide a tool wherein various size bits can be used by simple interchange of a part of the device.

Another object of the present invention is to provide a novel dowel drilling jig having the features and characteristics set forth above which is of relatively simplified construction, may be manufactured easily and cheaply, and is highly efficient and effective in operation and use.

These and other objects of the present invention and the various features and details of the operation and construction thereof are hereinafter more fully set forth and described with reference to the accompanying drawings, in which:

Fig. 1 is a perspective view of the present invention;

Fig. 2 is a front elevation partially in section showing the adjustability of the end posts with respect to the base;

Fig. 3 is a top plan view portraying how the jig of the present invention is employed to align dowel holes in work pieces which are to be joined together in side by side relation; and Fig. 4 is a top plan view illustrating how the present invention is utilized to set up a dowel joint between two work pieces meeting at right angles, as for example, the outer frame members of a conventional door.

Referring initially to Figs. 1 and 2, the jig of the present invention comprises a substantially rectangular base plate 10 with a semi-circular extension 11 at the mid-portion of one edge. Because of the comparative symmetry of the general configuration of the base, the extended portion aids the user in choosing the same end portion of the plate as a reference when working on articles that require moving the jig between operations. Thus identical gaugements are assured and possibility of reversing the plate is precluded. Fittings wherein an end-wise relation are essential can thus be made without any guesswork or remeasurements. A pair of guide rods 12, 12 are fixedly secured at right angles to the base plate 10, one rod being located in the circular extension 11 of the base plate, the other being disposed near the outer edge of the base plate parallel to the edge wherein the first post is located. The rods may be secured in the base plate 10 most economically by a suitable press fit between the rods and an opening provided in the base plate. A pair of posts 13, 13 having openings 14, 14 corresponding generally with the shape of the guide rods and extending longitudinally of the bottom portion thereof are adjustably mounted on the guide rods 12, 12. The position of the posts 13, 13 relative to the base plate 10 may be adjusted by means of set screws 15, 15 carried by each post in the lower portion which are adapted to be moved into engagement with the rods 12, 12 and thereby limit movement of the posts 13, 13 on the guide rods when the posts have been set at the desired height with respect to the base plate 10.

In accordance with the present invention a shaft 16 extending above the base plate 10 and generally parallel therewith is carried by the posts 13, 13. In the particular embodiment shown, the posts may have openings 17, 17 formed in the upper portion to accommodate the shaft 16 for movement longitudinally of the end posts. Lateral movement of the shaft 16 relative to the end posts 13, 13 may be limited by a pair of set screws 18, 18 mounted in the top portion of the end posts adapted to be moved into engagement with the shaft 16. Preferably the shaft is of rectangular or square cross section as shown for example in Fig. 1 to prevent rotary movement of the shaft 16 with respect to the posts 13, 13. The openings 17, 17 in the top portion of the posts may be suitably broached to accommodate either the square or rectangular shaft.

A plurality of arms 19, 19, extending downwardly and substantially perpendicular to the base are carried by the shaft 16 and are adapted for movement longitudinally of the shaft. Each arm 19 has a drill guide opening 20 extending transversely to the lower end with the axis of the drill guide opening extending transversely of the base 10 and substantially parallel thereto. The arms may be secured in any position along the shaft 16, as dictated by the lateral distance desired between the holes to be drilled, by means of set screws 21, 21 mounted in the top portion of the arm members and adapted to be moved into engagement with the shaft 16 As seen in Fig 2 the arms can be disposed entirely between the end posts or partially beyond and partially between as viewed in Fig 3 depending upon the need of a particular situation. Additionally the arms as a unit can be displaced with respect to a reference line on the base plate 10 by movement of the shaft 16 with respect to the post members.

Further the vertical relation of the drill guide opening 20 and the work piece can be varied by the adjustment of the end posts 13, 13 on the guide rods 12, 12.

To prevent marring the surface of the shaft 16 when fastening the set screws after repositioning the shaft with respect to the end posts 13, 13 or arm members 19, 19 a protective shield 22 may be provided intermediate the shaft and the set screw. In the particular embodiment shown in Fig. 2 the shield 22 is a C-shaped strap like member of steel or other suitable material.

All the components of the jig can be made from a suitable steel stock. However, in order to reduce overall weight and cost of manufacture, the arms 19, 19 and end posts 13, 13 may be constructed from aluminum, with steel bushing inserts 23, 23 provided in the lower portion of the arms to form the drill guide openings.

Figs. 3 and 4 show typical manners in which the device of the present invention may be employed to provide dowel pin holes. For example when it is desired to form a corner joint with two boards meeting at right angles the device is used as illustrated in Fig. 4. One of the two boards to be joined is placed on the base with the surface in which the dowel pin holes are to be drilled in engagement with the arms 19, 19 and the end edge of the board in alignment with the end edge of the base 10. The holes are then drilled by inserting a drill through the guide openings 20, 20. The other board to be drilled is placed on the base 10 in alignment with the end edge thereof and with the surface in which the holes are to be drilled in engagement with the opposite face of the arms 19, 19. The holes are then drilled in this board by inserting the drill through the openings 20, 20 in the arms, thereby assuring that the dowel pin holes in the two boards to be joined are in perfect alignment.

Additionally when it is desired to join two boards abutting in end to end relation by forming a series of holes equidistant from one another the jig can be manipulated in a manner shown in Fig. 3. Initially the work piece is positioned on the jig with an end in alignment with the jig reference line and the side to be drilled abutting the arms. The drill is then inserted in the openings 20, 20 and the holes formed. The jig is then moved laterally with respect to the work piece using a drilled location as a guide. This process is repeated until the length of the work piece has been suitably provided with dowel pin openings. The work piece to be joined is then placed on the opposite planar portion of the base plate 10 and a similar procedure as outlined above is followed to produce a corresponding series of equally spaced holes therein. The work pieces will accordingly mate in a satisfactory manner since a common reference was used to locate the holes. Further the arms 19, 19 may be adjusted longitudinally and vertically with respect to the base 10 to permit dowel pin holes to be drilled in any size board.

From the foregoing it will be apparent that the present invention provides a new and useful hand-tool device for aligning and forming holes for dowel joints. In addition it will be apparent that the invention provides a novel dowel drilling jig which is of relatively simplified construction, is easy to use and may be manufactured easily and cheaply.

While a particular embodiment of the present invention has been illustrated and described herein, it is not intended to limit the invention to such a disclosure and changes and modifications may be incorporated and embodied therein within the scope of the following claims.

I claim:

1. A dowel drilling jig comprising a substantially rectangular base plate, a pair of posts located on opposite edges of the base plate, a shaft carried by the post members spaced upwardly from said base plate and extending substantially parallel thereto, said shaft extending through said post members for longitudinal movement with respect to the post members, a plurality of arms spaced parallel to one another carried by the shaft projecting downwardly toward the base plate and substantially perpendicular thereto, means defining a drill guide opening extending transversely of the lower end of each arm, and locking means extending through the post members operable to engage the shaft to restrict movement of the shaft with respect to the post members when placed in engagement with said shaft and to permit longitudinal movement of the shaft when out of engagement with the shaft.

2. A dowel drilling jig comprising a substantially rectangular base plate, a pair of posts located on opposite edges of the base plate, a shaft carried by the post members spaced upwardly from said base plate and extending substantially parallel thereto, a plurality of arms spaced parallel to one another carried by the shaft projecting downwardly toward the base plate and substantially perpendicular thereto, means defining a drill guide opening extending transversely of the lower end of each arm, means defining an opening in the upper portion of each arm for lateral movement of the arm with respect to the shaft, and locking means extending through the arm members operable to engage the shaft to restrict movement of the arm members with respect to the shaft when placed in engagement with said shaft and to permit longitudinal movement of the arm members when out of engagement with the shaft.

3. A dowel drilling jig comprising a substantially rectangular base plate, a pair of posts located on opposite edges of the base plate, a shaft carried by the post members spaced upwardly from said base plate and extending substantially parallel thereto, a plurality of arms spaced parallel to one another, carried by the shaft projecting downwardly toward the base plate and substantially perpendicular to the base plate, means defining a drill guide opening extending transversely of the lower end of each arm, and means adjustably mounting the post members for vertical movement with respect to the base plate to thereby provide an adjustable relation between the drill guide openings and base plate.

4. Apparatus in accordance with claim 3 wherein the means adjustably mounting the post members comprises a pair of rods located on opposite edges of the base plate on which the posts are carried for vertical movement relative to the rod members, and locking means extending through said posts into engagement with said rods to interlock said posts with said rods.

5. A dowel drilling jig for locating and drilling holes in a work piece comprising a substantially rectangular base having a semi-circular index portion protruding approximately from mid-point of one edge of the base plate to facilitate proper disposition of the jig relative to the work piece during use, a pair of post members carried by the base plate, one of said post members extending upwardly from the semi-circular portion of the base plate and having its inner edge in alignment with said one edge of the base plate, the other post member extending upwardly from an edge of the base plate opposite the edge whereon semi-circular portion is formed, a shaft carried by the post members spaced upwardly from the base and extending substantially parallel thereto, a plurality of arms spaced parallel to one another carried by the shaft projecting downwardly toward the base plate and substantially perpendicular thereto, means defining a drill guide opening extending transversely of the lower end of each arm, and said base plate having a planar surface extending away from either side of the arms to form a locating surface for the work piece.

6. A dowel drilling jig comprising a substantially rectangular base plate, a pair of post members located on opposite edges of the base plate, means adjustably mounting the post members for vertical movement with respect to the base plate, a shaft carried by the post members spaced upwardly from the base plate and extending substantially parallel thereto, a plurality of arms spaced parallel to one another carried by the shaft projecting downwardly toward the base plate and substantially perpendicular thereto, means defining a drill guide opening extending transversely of the lower end of each arm, means adjustably mounting each arm on the shaft for lateral movement with respect to said shaft, and locking means extending through the arm members operable to engage the shaft to restrict movement of the arm members with respect to the shaft when placed in engagement with said shaft and to permit longitudinal movement of the arm members when out of engagement with the shaft.

References Cited in the file of this patent

UNITED STATES PATENTS 1,335,347     Moulds _____ Mar. 30, 1920